United States Patent [19]

Shemer

[11] Patent Number: 4,938,976

[45] Date of Patent: Jul. 3, 1990

[54] GLUTEN POSSESSING A FIBROUS STRUCTURE ITS MANUFACTURE AND MEAT-LIKE PRODUCTS OBTAINED THEREBY

[75] Inventor: Michael Shemer, Haifa, Israel

[73] Assignee: Tivall, Oshrat, Israel

[21] Appl. No.: 204,726

[22] Filed: Jun. 10, 1988

[30] Foreign Application Priority Data

Jun. 21, 1987 [IL] Israel .................................. 82929

[51] Int. Cl.$^5$ ................................................ A23J 3/00
[52] U.S. Cl. ...................................... 426/104; 426/656; 426/802
[58] Field of Search ..................... 426/656, 104

[56] References Cited

U.S. PATENT DOCUMENTS 4,238,515 12/1980 Shemer ............................ 426/104
4,296,133 10/1981 Tanaka et al. ................. 426/19 X
4,375,481 3/1983 Kuwabara et al. .............. 426/104
4,659,576 4/1987 Dahle et al. ..................... 426/324

*Primary Examiner*—Joseph Golian
*Attorney, Agent, or Firm*—Oblon, Spivak, McClelland, Maier & Neustadt

[57] ABSTRACT

Wheat gluten of high viscous texture possessing a viscosity of about 70,000 cps and a fibrous structure is described. The method for its manufacture involves: (a) agitating gluten with ascorbic acid in the presence of a solution of an edible acid at a pH in the range of between 4.0 and 8.0, preferably 5.0 and 7.0 and at a temperature below 70° C. to produce a relaxed gluten in the form of a viscous liquid-like structure, and (b) generating a stable fibrous structure by incorporating a textured vegetable protein. The wheat gluten is most useful to be incorporated in meat-like products.

16 Claims, No Drawings

GLUTEN POSSESSING A FIBROUS STRUCTURE ITS MANUFACTURE AND MEAT-LIKE PRODUCTS OBTAINED THEREBY

BACKGROUND OF THE INVENTION

The present invention relates to wheat gluten possessing a fibrous structure and a method for the preparation thereof. More particularly, the invention relates to gluten possessing a fibrous structure to be incorporated in meat-like and fish-like products.

Gluten occurs in nature in combination with carbohydrates and small amounts of lipids and minerals. It is considered as a concentrated natural cereal protein having a bland taste and aroma. It consists mainly of gliadin (prolamine) and glutenin (glutelin), and is mainly used in the bakery industry. The relation of gliadin to glutenin and the influence of ratio of the respective amounts of these two proteins in flour, upon baking quality, have been the subject of numerous investigations.

Increasing attention is now given to the gliadin fraction of gluten. It has been stated that the peculiar properties of gliadin may be due to the hydrogen bonding between the amide groups present in the side chains of the amino acids constituents of this fraction, leading to considerable cross-linking between protein melecules. This is also manifested by the distinctive spongy structure of gliadin. However, the intramolecular bonds in gluten are complex and far from the above scenario, and probably many forces are in play besides hydrogen bonding and disulfide bonds, the latter being considered to exist between the cysteine residues.

U.S. Pat. No. 4,238,515 describes a novel physical form of gluten possessing a net-like fibrous structure being produced by agitating wheat gluten with a reducing agent at a temperature below 70° C. The preferred reducing agents suggested are sodium sulfite and sodium bisulfite. The novel physical form of gluten is mentioned to be most useful as a self-binder in analog-meat products and also as an extender for meat.

In the last few years the Food and Drug Administration (FDA) has reported a number of documents on the problem of the safety of sulfiting agents. As known, sulfiting agents (sodium or potassium salts of sulfite, bisulfite and metabisulfite) are effective in preventing food discoloration due to enzymatic browning. They also serve as microbial growth antagonists and are used to extend the shelf life of fresh cut fruits and vegetables. In 1983, the FDA announced that it had received reports of about 90 cases of adverse reactions (including one death) allegedly caused by ingestion of sulfites in foods.

In addition to the above U.S. Patent which seems to be the most pertinent prior art, there are other patents dealing with protein-based meat-like products having a fibrous structure. Thus according to U.S. Pat. No. 3,197,310, meat-like products having a fibrous structure are obtained by mixing gluten with defatted oil and seed flour and heating at 115° C. The main disadvantage of this process is the denaturation of the protein which occurs at the relatively high temperature employed.

According to U.S. Pat. No. 3,047,395, elastic fibers of a meat-like texture can be obtained from soy flour mixed with water which is heated under pressure. U.S. Pat. No. 3,645,747 describes a method for coagulation of gluten to produce meat-like products having filaments and extended cellular structure wherein heat is used to fix permanently the fibrous structure. However, this method does not allow formation of the heated matrix into meat-like products.

It is interesting to note U.S. Pat. No. 3,409,440 which describes the formation of a stable froth by heating gluten with ascorbic acid, water and glycerin.

U.S. Pat. No. 4,125,630 deals with pliable fibrous texture vegetable protein and meat analogs formulated therewith. It is pointed out in this document that heating to an elevated temperature is absolutely required.

In a very recent U.S. Pat. No. 4,615,901, entitled "Process for separating food stuff having fiber structure" in which wheat gluten is used, temperatures in the range of 75° to 120° C., are claimed. It is specifically stipulated that at temperatures below 75° C., it is difficult to get a sufficient fiber structure. This might explain why the heating was suggested, although heating does involve some denaturation of protein.

SUMMARY OF THE INVENTION

It is an object of the present invention to provide a gluten having a fibrous structure.

It is another object of the present invention to provide a gluten with a fibrous structure, which does not utilize sulfiting agents or involve the generation of heat. It is another object of the present invention to provide a method for manufacturing gluten with a fibrous structure and its vital and undenaturated form possessing binding properties to be incorporated in meat-like products.

The invention which satisfies all of these objects and other objects which will become apparent from the description of the invention given hereinbelow, relates to a particular structure of gluten possessing a viscosity of above 70,000 cps and bonding properties, obtained by a method which comprises: (a) agitating gluten with ascorbic acid in the presence of a solution of an edible acid at a pH in the range of between 4.0 and 8.0, preferably 5.0 to 7.0, and at a temperature below 70° C. to produce a relaxed gluten in the form of a viscous liquid-like structure, and (b) generating a stable fibrous structure by incorporating a textured vegetable protein.

DETAILED DESCRIPTION OF THE PREFERRED EMBODIMENTS

It was unexpectedly found that the presence of an edible acid enhances significantly the effect of ascorbic acid to generate the fibrous structure. As will be shown in the table summarizing the experiments concerning the formation of the desired structure, the synergistic effect using the ascorbic acid with an edible acid is quite significant.

Ascorbic acid alone, being a mild antioxidant, has only a weak influence on the gluten in obtaining the desired structure and poor binding property in its use as a binding agent in meat-like products, compared with sulfiting agents used as reducers. On the other hand, acetic acid by itself, is not a reducing agent, and its low pH will substantially deteriorate the taste of gluten. Moreover, on the contrary as mentioned in the prior art, acetic acid does solubilize a substantial portion of the gliadin fraction from the gluten.

It was found that the preferred pH to be maintained in order to obtain the synergistic effect with the ascorbic acid and an edible acid, on the formation of the desired structure of wheat gluten with improved binding properties, should be in the range of 4.0 to 8.0, preferably 5.0 to 7.0 Below a pH of about 5.0, the taste of the mixture containing the gluten begins to deteriorate and the binding properties will decrease.

The prevailing temperature during the formation of the desired structure of gluten, should be maintained below 70° C. and preferably in the range of between 30° and 55° C. Beyond 70° C., although the fibrous structure is obtained, some denaturation occurs which will affect the texture of the final products.

The inventor is not yet in a position to explain theoretically why an edible acid has a synergistic effect on the action of ascorbic acid to impart the fibrous structure. It appears that by incorporating an edible acid together with the ascorbic acid, the edible acid solubilizes the wheat gluten. Accordingly, the action of the ascorbic acid on the gluten present in the aqueous system is much enhanced.

Gluten has a relatively large number of non-polar side chains and those have the effect of imparting water insolubility and of contributing to cohesive properties. As the protein hydrates by the mixing of gluten with water, it will develop coherent and elastic properties. Further mixing produces a dough that is sticky, more extensible and less elastic (known under the name of "dough breakdown"). The disulfide linkages are probably of the greatest importance to the dough properties. It seems that sulfitic reagents are indeed capable of imparting a reduction of disulfide bonds causing a complete loss of dough cohesion. Other antioxidants such as ascorbic acid, have only a poor effect.

Among the edible acids suitable for the present invention the following are mentioned: acetic acid, adipic acid, tartaric acid, malic acid, succinic acid, citric acid, phosphoric acid and combinations thereof. The acetic acid may be either in the form of a fermented alcohol or produced from natural source such as vinegar (apple, wine etc.). The latter source is particularly preferred. The concentration of the edible acid solution added to the wheat gluten and ascorbic acid should be generally in the range of 3 to 10% (by weight) keeping in mind that a higher concentration might decrease the pH below 7.0 as suggested according to the present invention.

Another parameter imposed by the method according to the present invention is the upper limit of temperature prevailing during agitation i.e. not above 70° C. Above this temperature zone denaturation of protein is involved which affects also the texture of the product and therefore it is most suggested not to surpass this upper limit. This is quite contrary to the prior teachings mentioned in the prior art which sustain that high temperatures are required for the formation of fibrous structure. Thus for instance in the known textbook on proteins (Food proteins by J. M. Whittaker et al. Av. Publishing Company, 1977 p. 501) it is stipulated: "For good fiberization of protein to occur, it is necessary to employ a temperature high enough to cause a redistribution of the water soluble protein moiety with a subsequent overall insolubilization of the protein". According to the present invention, in the presence of an edible acid and ascorbic acid, the disulfide bonds are opened and deprived from the dough cohesion and accordingly temperatures below 70° C. will be sufficient to impart the fibrous structure.

One of the main advantages of the method according to the present invention compared with that described in the previous U.S. Pat. No. 4,238,518, is the complete absence of sulfiting agents required therein in order to soften the sticky mass of gluten. As known, sulfiting agents possess a strong potential for reducing disulfide bonds, but they also effect to some extent the taste of the final product. Accordingly, the meat-like products obtained according to the present invention possess a much better taste than those obtained according to the previous patent.

When utilized in meat-like products, additional ingredients such as coloring agents, flavoring reagents and fat are incorporated. Various products can be obtained such as sausage, hamburger, meat-like spread particular advantage of being completely vegetarian, consisting of pure vegetable protein food which closely duplicates the nutrition, flavor, texture and appearance of meat. It can be precisely formulated to provide the required nutritional levels of protein, fat and carbohydrates. Also minor amounts of vitamins and minerals may be incorporated.

When vinegar is used as a source of edible acid, the products obtained have the clear advantage of containing two desirable constituents: vitamin C (ascorbic acid) and a natural additive (vinegar).

The inventor carried out a systematic investigation, using various ingredients under controlled conditions to find out and evaluate when the fibrous structure of wheat gluten, possessing self binding property is obtained. The following Table 1 summarizes results obtained in a number of experiments with various additives and without any additives using the same vessel, and the same amounts of gluten (340 g) and water (570 g). The beginning and end of forming a relaxed gluten viscous liquid-like mass, and the respective time thereof, as well as the temperature and the pH at the end of the agitation, were determined.

TABLE 1

Wheat Gluten Fibrous Structure Formation (340 g gluten + 570 g water) with and without additives.

| Exp. No. | Additive(s) | Time of Fibrous structure formation | | T (°C.) | pH | Remarks |
| --- | --- | --- | --- | --- | --- | --- |
| | | beginning (seconds) | end (seconds) | | | |
| 1 | None | 120 | 150 | 65 | 6.65 | — |
| 2 | None | 105 | 125 | 65 | 6.5 | — |
| 3 | 0.08 g AA | 75 | 105 | 50 | 6.5 | − + |
| 4 | 0.8 g AA + 30 mls Acetic acid (5%) | 30 | 60 | 40 | 6.0 | + + |
| 5 | 0.8 g AA + 6 mls Acetic acid (10%) | 90 | 100 | 46.4 | 6.0 | + + |
| 6 | 0.8 g AA + 6 mls Malic acid (10%) | 90 | 110 | 46 | 6.1 | + |
| 7 | 0.8 g AA + 24 mls Succinic acid (5%) | 45 | 65 | 46 | 6.5 | + + |
| 8 | 0.8 g AA + 12 mls | 65 | 90 | 43 | 6.4 | + + |

TABLE 1-continued

Wheat Gluten Fibrous Structure Formation (340 g gluten + 570 g water) with and without additives.

| Exp. No. | Additive(s) | Time of Fibrous structure formation beginning (seconds) | end (seconds) | T (°C.) | pH | Remarks |
|---|---|---|---|---|---|---|
| 9 | Tartaric acid (10%) 0.8 g AA + 24 mls adipic acid (5%) | 45 | 60 | 43.6 | 5.5 | + + |
| 10 | 0.8 g AA + 15 mls cider (10%) | 30 | 60 | 42 | 5.9 | + + |

AA = Ascorbic acid; cider = vinegar of apple.
− − = Very weak fibrous structure and without binding property.
− + = Weak fibrous structure with poor binding property.
+ + = Net-like fibrous structure with strong binding property.
(all the concentrations are by weight).

As appears from the above Table, when the gluten is mixed with water, without any additives, a very weak fibrous structure was obtained and no binding property was noticed, the dough appearing as a sticky dough. The increase in temperature to 61°-65° C. is a result of the energy input from the mixer during the agitation (105-150 seconds). By adding ascorbic acid alone, some loss in dough cohesion was noticed after 75 seconds with a weight fibrous structure after 105 seconds. In this case the temperature was lower (50° C.) than in the previous experiments without additives. From the other six experiments, where an edible acid was also incorporated it clearly appears that the temperature did not surpass 46° C., the final product appearing as a homogeneous viscous liquid-like mass which by admixing with textured vegetable protein is transformed into a net-like fibrous structure possessing binding property. As appears, adding the edible acid as a dilute solution, the pH was between 6.0-6.5 i.e. quite similar to the case when no additives at all were incorporated.

The particular structure of the gluten obtained according to the present invention is characterized by its highly viscous appearance with a viscosity of above 100,000 cps. Some comparative viscosity tests were carried out on the apparatus "Consistometer for pulp and concentrates" (produced by Central Scientific Corporation, U.S.A.) on the gluten structure obtained according to the present invention (B) and the novel physical form (A) obtained according to U.S. Pat. No. 4,238,515 (using sulfiting agent). The consistometer apparatus used consists of a calibrated horizontal table (about 30 cm length) which indicates the forward movement of a certain amount of material. The apparatus can also be inclined at an angle of 68° with the horizontal plane. The samples were prepared in the same apparatus High Speed Mixer - Blender Robotcoupe at 1500 rpm (produced by Robot Coupe S.A., France) using the same amount of rehydrated wheat gluten as starting material.

The following comparative results were obtained measuring the respective movements on the Table.

| Composition | Movement | Time |
|---|---|---|
| (a) On the horizontal Table: | | |
| A | 5 cm | 20 seconds |
| A | 5.6 cm | 30 seconds |
| A | 6.6 cm | 60 seconds |
| B | Close to zero | 300 seconds |
| (b) On the inclined Table (68° to the horizontal plane). | | |
| A | 2.5 cm | 2 seconds |
| A | 3.3 cm | 3 seconds |
| A | 20 cm | 6 seconds |
| B | 0.2 cm | 360 seconds |

The above comparative results clearly indicate the higher viscosity of the gluten mass obtained according to the present invention compared with that obtained according to U.S. Pat. No. 4,238,515. It was found that the higher viscous mass imparts a better texture to the final products.

The wheat gluten with its fibrous structure, obtained according to the present invention, was found to be most useful for preparing various forms of meat-like or fish-like products resembling meat and fish texture. Due to its binding property, it can also replace even completely the relatively expensive egg albumen or substantially reduce the incorporation of the latter. It can also be utilized as an extender or analog component for a variety of vegetables, cereal snack, baby foods, puddings, deserts and similar products. The fibrous products obtained thereof may be conveniently formulated with other conventional food additives such as vitamins, antimicrobial agents, antioxidants, flavor potentiators etc. In this manner, the invention provides a relatively low cost vegetable protein raw material substitute for expensive natural food ingredients, inexpensively processed to provide undergraded fibrous proteinaceous material which effectively simulate the texture, flavor, color, overall appearance and mouthfeel of high-quality natural food products.

The following examples are presented only for illustrating the invention and for its better understanding without being limited thereto. The amounts and concentrations are given by weight unless otherwise stated.

EXAMPLE 1

An amount of 340 g wheat gluten was mixed with 570 g water under a slow agitation (60 rpm) for about 5 minutes, generating a gluten dough. To the resulted mixture there were added 0.2 g ascorbic acid and 30 mls of acetic acid (5%). The pH of the mass was 6.0. After that, the mixture was agitated at a high speed (1500 rpm) for about 60 seconds whereby a very viscous mass was obtained and a sudden increase noticed in the mixer's motor amperage. The temperature of the mixture was 60° C.

To the viscous mass it was added an amount of 1000 g of hydrated textured vegetable protein (TVP) together with 100 g vegetable oil, salt, pepper and other spices according to desired taste. The homogeneous mass was stuffed into a cellulose casing and cooked in boiling water. After cooling and peeling the meat-like sausages produced were packed.

EXAMPLE 2

An amount of 500 g of wheat gluten was mixed with 900 g water under a slow agitation (60 rpm) for about 5 minutes generating a gluten dough. To the resulted mixture there were added 1.5 g ascorbic acid and 10 mls of malic acid (5%), the pH of the mass was 6.1. After that the mixture was agitated at a high speed (1500 rpm) for about 90 seconds, whereby a very viscous mass was obtained and a sudden increase noticed in the mixer's motor amperage. The temperature of the mixture was 58° C.

To the viscous mass it was added an amount of 3000 g of hydrated structured cottonseed protein and mixed for about 60 seconds. Also, there were added 200 g of vegetable oil, egg albumen (100 g) and spices to the desired taste and further mixed for about 30 seconds. From the resulted mixture, meat-like balls and hamburger were prepared.

Obviously, numerous modifications and variations of the present invention are possible in light of the above teachings. It is therefore to be understood that within the scope of the appended Claims, the invention may be practiced other wise than as specifically described herein.

I claim:

1. A gluten which is free of added sulfiting agents comprising wheat gluten having a viscosity above 70,000 cps with a fibrous structure and possessing binding properties, obtained by a method which comprises:
    (a) agitating wheat gluten with ascorbic acid in the presence of a solution of an edible acid at a pH in the range of between 5.0 and 7.0 and at a temperature below 70° C. to obtain a relaxed gluten in the form of a viscous liquid-like structure; and
    (b) generating a stable fibrous structure by incorporating a textured vegetable protein in said relaxed gluten obtained in step (a).

2. The gluten of claim 1, wherein said temperature is between 20° and 55° C.

3. The gluten of claim 1, wherein said edible acid is selected from the group consisting of acetic acid, adipic acid, tartaric acid, citric acid, malic acid, succinic acid, phosphoric acid and mixtures thereof.

4. The gluten of claim 3, wherein said solution of an edible acid has a concentration of between 3% and 10% by weight.

5. The gluten of claim 4, wherein said solution of an edible acid is a product from a natural source.

6. The gluten of claim 5, wherein said solution of an edible acid is vinegar.

7. A meat-like product comprising a gluten having a fibrous structure and possessing binding properties in combination with a coloring agent, a spice providing a meat-like taste and a fat, wherein said gluten with a fibrous structure and possessing binding properties is obtained by:
    (a) agitating wheat gluten with ascorbic acid in the presence of a solution of an edible acid at a pH in the range of between 5.0 and 7.0 and at a temperature below 70° C. to produce a relaxed gluten in the form of a viscous liquid-like structure; and
    (b) generating a stable fibrous structure by incorporating a textured vegetable protein into said relaxed gluten.

8. A fish-like product comprising a gluten having a fibrous structure and possessing binding properties in combination with a coloring agent, a spice providing a fish-like taste and a fat, wherein said gluten composition having a fibrous structure and possessing binding properties is obtained by:
    (a) agitating wheat gluten with ascorbic acid in the presence of a solution of an edible acid at a pH in the range of between 5.0 and 7.0 and at a temperature below 70° C. to produce a relaxed gluten in the form of a viscous liquid-like structure; and
    (b) generating a stable fibrous structure by incorporating a textured vegetable protein in said relaxed gluten.

9. A method for the manufacture of gluten with a fibrous structure possessing binding properties, which comprises:
    (a) agitating wheat gluten with ascorbic acid in the presence of a solution of an edible acid at a pH in the range of between 5.0 and 7.0 and at a temperature below 70° C. to produce a relaxed gluten in the form of viscous liquid-like structure; and
    (b) generating a stable fibrous structure by incorporating a textured vegetable protein in said relaxed gluten.

10. The method of claim 9, wherein said temperature is between 20° and 55° C.

11. The method of claim 9, wherein said edible acid is selected from the group consisting of acetic acid, adipic acid, tartaric acid, citric acid, malic acid, succinic acid, phosphoric acid and mixtures thereof.

12. The method of claim 11, wherein the concentration of said solution of edible acid is between 3% and 10% by weight.

13. The method of claim 12, wherein said edible acid is of a natural source.

14. A method for the manufacture of a meat-like or fish-like product comprising incorporating a coloring agent, a spice and a fat into a gluten product obtained by:
    (a) agitating wheat gluten with ascorbic acid in the presence of a solution of an edible acid at a pH in the range of between 5.0 and 7.0 and at a temperature below 70° C. to produce a relaxed gluten in the form of viscous liquid-like structure; and
    (b) generating a stable fibrous structure by incorporating a textured vegetable protein in said relaxed gluten.

15. The method of claim 14, further comprising adding to said product a minor amount of a binder other than said wheat gluten.

16. The method of claim 14, wherein minor amounts of vitamins and minerals are incorporated.

* * * * *

UNITED STATES PATENT AND TRADEMARK OFFICE
CERTIFICATE OF CORRECTION

PATENT NO.  : 4,938,976
DATED       : JULY 3, 1990
INVENTOR(S) : MICHAEL SHEMER

It is certified that error appears in the above-identified patent and that said Letters Patent is hereby corrected as shown below:

Title page, item [73] Assignee, should read --Tivall, Oshrat, Israel (Part Interest)--.

Signed and Sealed this

Thirtieth Day of March, 1993

Attest:

STEPHEN G. KUNIN

*Attesting Officer*     Acting Commissioner of Patents and Trademarks